(12) United States Patent
Novak et al.

(10) Patent No.: US 8,528,069 B2
(45) Date of Patent: Sep. 3, 2013

(54) TRUSTWORTHY DEVICE CLAIMS FOR ENTERPRISE APPLICATIONS

(75) Inventors: Mark Novak, Newcastle, WA (US); Yair Tor, Shorashim (IL); Eugene Neystadt, Kfar-Saba (IL); Yoav Yassour, Zikhron Yaakov (IL); Alexey Efron, Nesher (IL); Amos Ortal, Kfar Yona (IL); Daniel Alon, Tel Mond (IL); Ran Didi, Haifa (IL)

(73) Assignee: Microsoft Corporation, Redmond, WA (US)

( * ) Notice: Subject to any disclaimer, the term of this patent is extended or adjusted under 35 U.S.C. 154(b) by 269 days.

(21) Appl. No.: 13/015,202

(22) Filed: Jan. 27, 2011

(65) Prior Publication Data
US 2012/0084850 A1  Apr. 5, 2012

Related U.S. Application Data

(60) Provisional application No. 61/388,455, filed on Sep. 30, 2010.

(51) Int. Cl.
*G06F 15/16* (2006.01)

(52) U.S. Cl.
USPC ............... 726/10; 726/8; 726/3; 709/203

(58) Field of Classification Search
USPC ................... 726/10, 8, 3; 709/203
See application file for complete search history.

(56) References Cited

U.S. PATENT DOCUMENTS

| | | | |
|---|---|---|---|
| 5,694,601 A * | 12/1997 | White | 718/101 |
| 5,968,176 A * | 10/1999 | Nessett et al. | 726/11 |
| 6,321,338 B1 * | 11/2001 | Porras et al. | 726/25 |
| 6,873,988 B2 * | 3/2005 | Herrmann et al. | 1/1 |
| 7,114,174 B1 * | 9/2006 | Brooks et al. | 725/105 |
| 7,774,824 B2 | 8/2010 | Ross | |
| 7,792,920 B2 * | 9/2010 | Istvan et al. | 709/217 |
| 7,809,807 B2 * | 10/2010 | Tominaga | 709/220 |
| 8,054,494 B2 * | 11/2011 | Takahashi et al. | 358/1.15 |
| 8,244,886 B2 * | 8/2012 | Short et al. | 709/228 |
| 8,312,079 B2 * | 11/2012 | Newsome et al. | 709/203 |
| 2002/0138643 A1 * | 9/2002 | Shin et al. | 709/232 |
| 2003/0033368 A1 * | 2/2003 | Tominaga | 709/203 |
| 2003/0065942 A1 * | 4/2003 | Lineman et al. | 713/201 |
| 2007/0033643 A1 | 2/2007 | Rossi et al. | |
| 2007/0150934 A1 | 6/2007 | Fiszman et al. | |
| 2007/0174917 A1 | 7/2007 | Guruswamy | |
| 2007/0195779 A1 * | 8/2007 | Judge et al. | 370/392 |
| 2008/0301784 A1 * | 12/2008 | Zhu et al. | 726/5 |
| 2009/0164564 A1 * | 6/2009 | Willis | 709/203 |

(Continued)

OTHER PUBLICATIONS

Durfee, et al., "Posture-Based Data Protection," retrieved Aug. 27, 2010, 20 pages.

Kuntze, et al., "Trusted Ticket Systems and Applications," retrieved Aug. 27, 2010, 17 pages, *Fraunhofer Institut Sichere Informations-Technologie*.

McCune, et al., "How Low Can You Go? Recommendations for Hardware-Supported Minimal TCB Code Execution," © 2008, retrieved Aug. 27, 2010, 12 pages, *Carnegie Mellon University, University of North Carolina at Chapel Hill*.

(Continued)

*Primary Examiner* — William Powers
*Assistant Examiner* — Tongoc Tran (57) ABSTRACT

Embodiments of the invention enable a client device to procure trustworthy device claims describing one or more attributes of the client device, have those device claims included in a data structure having a format suitable for processing by an application, and use the data structure which includes the device claims in connection with a request to access the application. The application may use the device claims to drive any of numerous types of application functionality, such as security-related and/or other functionality.

20 Claims, 6 Drawing Sheets

(56) References Cited

U.S. PATENT DOCUMENTS

| | | |
|---|---|---|
| 2009/0249076 A1* | 10/2009 | Reed et al. .................... 713/181 |
| 2009/0320073 A1* | 12/2009 | Reisman ......................... 725/51 |
| 2010/0024005 A1* | 1/2010 | Huang et al. ...................... 726/3 |
| 2010/0332825 A1* | 12/2010 | Bradley et al. ................ 713/158 |

OTHER PUBLICATIONS

Schmidt, et al., "Trust for Location-based Authorisation," retrieved Aug. 27, 2010, 6 pages, *Fraunhofer Institute for Secure Information Technology SIT; Nokia Siemens Networks GmbH & Co. KG.*

\* cited by examiner

TRUSTWORTHY DEVICE CLAIMS FOR ENTERPRISE APPLICATIONS

CROSS-REFERENCE TO RELATED APPLICATION

This application claims priority under 35 U.S.C. §119(e) to U.S. provisional patent application Ser. No. 61/388,455, entitled "Trustworthy Device Claims for Enterprise Applications," filed on Sep. 30, 2010, the entirety of which is incorporated herein by reference.

BACKGROUND

Many organizations seek to offer users the ability to transparently access applications from any location, using any device, at any time. Providing users this level of access involves overcoming a number of obstacles, including those relating to security. For example, organizations may seek to provide different levels of application access to users depending on their role in, and/or relationship to, the organization.

SUMMARY

Commonly assigned U.S. patent application Ser. No. 12/822,724, entitled "Network Layer Claims Based Access Control," filed Jun. 24, 2010, discloses techniques that provide flexibility with respect to making access control decisions at the network layer of the OSI stack, through the use of information provided in "claims" (also known to those skilled in the art as assertions). Briefly, the above-referenced application discloses that claims may provide information useful in making access control decisions at the network layer. In this respect, claims may include information on any of numerous attributes of a computer requesting access to a resource, the circumstances surrounding the requested access, the resource to which access is requested, and/or other information. In accordance with disclosed techniques, information provided in claims may be evaluated in light of one or more access control policies, and used in deciding whether to grant or deny a requesting computer access to a particular network resource. Because the information provided in claims may be more detailed than that which was previously used to make access control decisions at the network layer, access control policies may be more flexibly formulated, and greater flexibility may be provided in making access control decisions, so as to take into account information of varied nature or type.

Applicant has appreciated that information provided in claims that describe characteristics or attributes of a computer requesting access to an application (hereinafter "device claims") may be employed by an application to which access is requested to drive any of numerous types of application functionality. This functionality may include access authorization and/or other security-related functionality, or any of numerous other types of functionality. For example, the application could verify that the device satisfies certain criteria prior to making particular functionality or data available to the device, could generate output suited to the device's characteristics and/or capabilities, or use information provided by the device in claims form in any of numerous other ways. Embodiments of the invention are not limited to any particular use(s).

Some embodiments of the invention provide a process whereby the information in device claims is converted into a form which applications are configured to process. In this respect, Applicant has appreciated that while device claims are conventionally used (e.g., to accomplish flexible decision-making with respect to access control, as disclosed in the above-referenced commonly assigned application), they are not conventionally used by applications, and applications are not configured to process device claims in the form in which they are conventionally provided. As a result, some embodiments of the invention allow for information in claims to be provided to an application in a form which the application is configured to consume. For example, device claims are often issued by a Security Token Service (STS) in X.509 certificate form, and applications are not configured to process device claims provided in this form. In accordance with some embodiments of the invention, device claims included in an X.509 certificate may be converted to a form which applications are configured to process, such as a Security Assertion Markup Language (SAML) token. In some embodiments, an X.509 certificate may first be converted to a Kerberos ticket (e.g., as described in the above-referenced application), and then converted to a SAML token for provision to the application. In other embodiments, an X.509 certificate may be converted directly to a SAML token, without first being converted to a Kerberos ticket. Any of numerous implementations are possible, and embodiments of the invention are not limited to providing device claims to an application in any particular form, or converting device claims to that form in any particular way.

In some embodiments, the device claims which are provided to an application are generated so as to be "trustworthy," so that the application may be assured that the information represented therein is an accurate and genuine representation of device characteristics and/or attributes. For example, some embodiments of the invention provide for the certificate that includes device claims to be generated via a remote attestation process wherein a client device procures assessments of its state and characteristics from one or more data sources (e.g., external data sources), and provides the assessment(s) to an attestation server for generation of device claims. Because the device claims are generated via a remote attestation process, they may be accepted by the application as a trustworthy representation of the device's state, characteristics and/or attributes.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
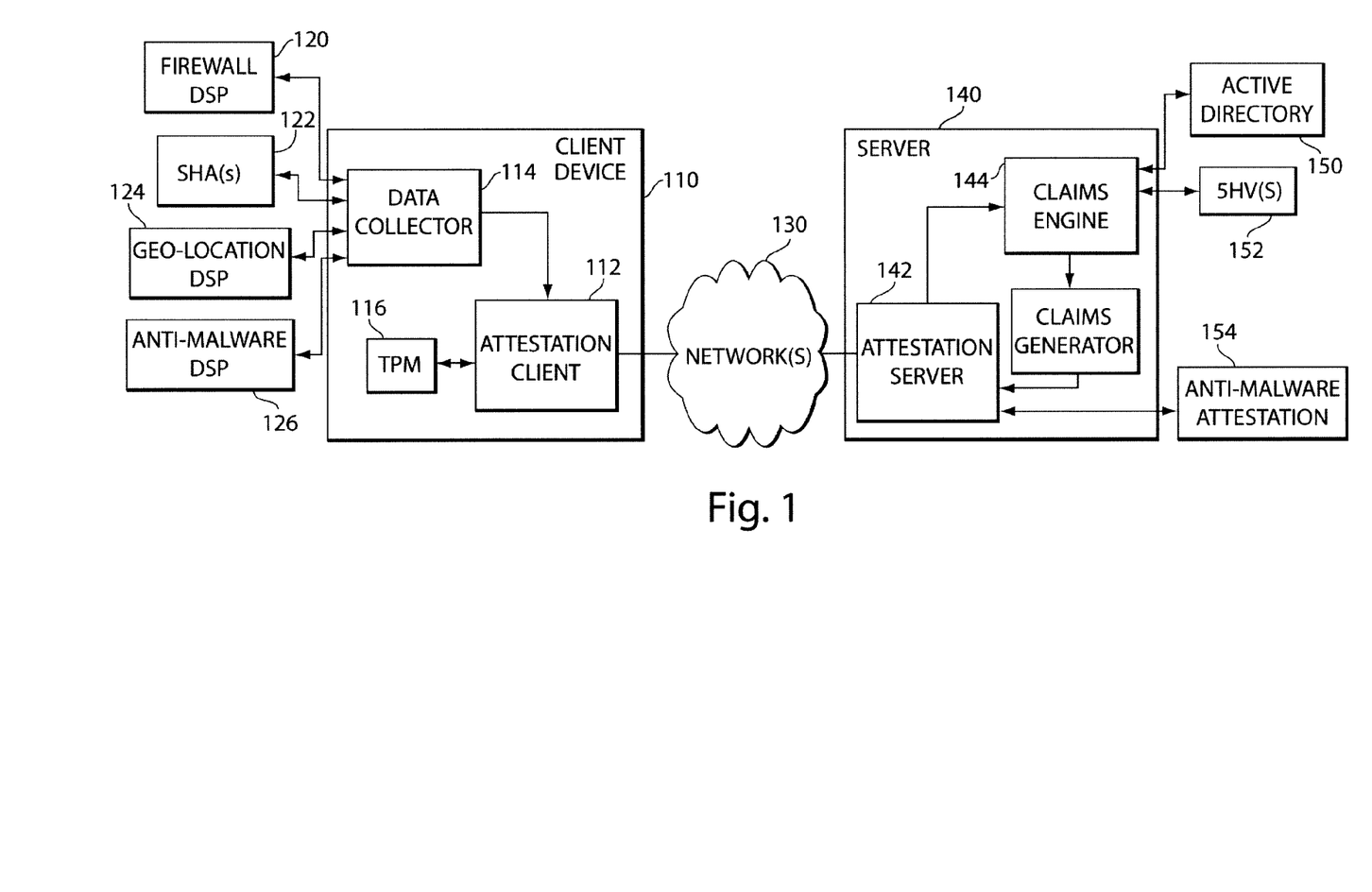
FIG. 1 is a block diagram depicting a system in which a client device procures a certificate that includes device claims information, in accordance with some embodiments of the invention.

FIG. 1 depicts an example system which may be employed to generate a certificate including trustworthy device claims. The system of FIG. 1 ensures the "trustworthiness" of device claims so as to guarantee their authenticity and integrity to downstream entities, such as an application receiving the claims for processing. In the example system of FIG. 1, trustworthiness is ensured via a remote attestation process, whereby client device 110 authenticates itself to an attestation server 142 (in the example shown, implemented on server 140) over one or more networks 130. Because the client shows itself to be trustworthy via the remote attestation process, attestation server 142 "attests" that the device claims are genuine, authentic and trustworthy indications of the state, characteristics and/or attributes of client device 110. Device claims designated as trustworthy may thereafter be used in relation to requests by client device 110 to access network resources, and the resources that are accessed may be assured that the information describing state, characteristics and/or attributes of client device 110 is accurate.

In the example system shown in FIG. 1, client device 110 contacts server 140 to request a certificate that includes information relating to client device 110 in claims form. For example, the request issued by client device 110 to server 140 may be for a X.509 certificate which includes information relating to client device 110, provided in claims form. Of course, not all embodiments of the invention may include device claims in an X.509 certificate, as any of numerous forms may be employed, and embodiments of the invention are not limited to any particular implementation. Further, the device claims may be provided in any suitable form(s), as embodiments of the invention are not limited in this respect. For example, in some embodiments of the invention, device claims are represented via one or more Issuance Policy (IP) OIDs, which those skilled in the security and authentication arts will recognize are hierarchical numerical constructs encoded using an X.509 extension which may be used to convey device state and characteristics. Of course, embodiments of the invention are not limited to representing device claims using IP OIDs, as any one or more suitable forms of representation, including forms encoded using proprietary techniques, may alternatively be employed.

The device claims may include any of numerous types of information relating to client device 110. For example, information may include an indication of the "health" of client device 110 (e.g., whether it is equipped with security and/or anti-virus software, whether certain (e.g., security) software is activated, whether the client device employs a firewall, whether the firewall is operational, whether anti-virus signatures are up-to-date, etc.), the type of cryptography used by the client device to access resources (e.g., whether signing and/or encrypted communications are used for communication, the type of encryption, etc.), an identifier for client device 110, a role which the client device performs (e.g., as a desktop computer, database server, web server, etc.), an organizational affiliation for the client device (e.g., operated by the sales department, finance department, etc.), its owner (e.g., a company, employee, vendor, etc.), a geographic location of the device, and/or any of numerous other types of information. Embodiments of the invention are not limited in this respect.

It should be appreciated that client device 110 shown in FIG. 1 may be any suitable computing device, such as a desktop or laptop computer, mobile telephone, personal digital assistant, content reproduction device, television, gaming console and/or any other suitable device type. Embodiments of the invention are not limited to being used with any particular type(s) of device(s).

To collect information relating to client device 110, data collector 114 communicates with one or more data sources. In some embodiments, data collector 114 is extensible, so that the information it collects may be supplemented over time (e.g., via one or more plug-ins). Each data source provides information indicative of the state and/or health of client device 110, based on information supplied by data collector 114 to the data source. In some embodiments, each data source may "sign" the information it provides to data collector 114 to provide assurance of the information's accuracy.

In the example shown, data collector 114 communicates with firewall device state provider (DSP) 120 to provide information on the state of a firewall on client device 110, with security health agent (SHA) 122 to provide information on the health of client device 110, with geo-location DSP 124 to provide information on the current physical location of client device 110, and with anti-malware DSP 126 to provide information on an anti-malware engine (not shown) on client device 110. The information provided to any or all of components 120, 122, 124 and 126 may, for example, describe a state of client device 110 at or after the occurrence of any of numerous events during the life cycle of client device 110, such as a reboot of its operating system (not shown in FIG. 1), a resumption from hibernation/sleep, installation of one or more drivers or software patches, initiation of network connectivity, a location change, or other event. The information may therefore be dynamically generated and/or contextual, as it may relate to the state of client device at a particular time, the circumstances during which claims are requested (e.g., the location of the device), etc.

In the example shown, data collector 114 receives signed information from each of data sources 120, 122, 124 and 126, and provides this information to attestation client 112 on client device 110. Of course, embodiments of the invention are not limited to such an implementation, as any of numerous transformations may be applied to information received from any of data sources 120, 122, 124 and 126.

In addition, attestation client 112 communicates with TPM 116. TPM 116 may perform any of several functions relating to the remote attestation process. For example, TPM 116 may allow events to be collected in its Platform Configuration Registers (PCRs); allow cryptographic keys to be generated, stored and used; allow "quotes" over a construct called the "TCG log" (not shown) to be generated to attest as to the trustworthiness of events reported in that log to a remote party; maintain a "boot counter" that can be used to differentiate successive boot cycles and provide additional security measures spanning hibernate/restart events; and/or perform other functions. Information generated as a result of any one or more of these functions may be communicated to attestation client 112. Of course, a TPM need not be employed in a remote attestation process, as embodiments of the invention are not limited in this respect. If an indication is provided by a TPM, it may be provided in the form of a measurement expressed in numeric form, although embodiments of the invention are not limited in this respect.

Attestation client 112 then provides the information collected from data sources 120, 122, 124 and 126, and the indication received from TPM 116, to attestation server 142 via network(s) 130. In some embodiments, attestation server 142 may evaluate information received from attestation client 112, such as by validating measurements generated by TPM 116 to determine that measurements were not modified after generation, and/or by determining whether client device 110 is free of viruses. Of course, attestation server 142 may evaluate any information received from attestation client 112, in any of numerous ways, as embodiments of the invention are not limited in this respect. If the results of the evaluation are such that generation of device claims should proceed (as an example, if client device 110 is determined to be free of known malware, including but not limited to known viruses), then attestation server 142 may initiate the generation of device claims for client device 110.

In some embodiments, the initiation of claims generation by attestation server 142 means by implication that the information received from the client device has been accepted by attestation server 142 as trustworthy, and therefore that device claims generated by the attestation server on the basis of the information received from client device 110 are to be accepted as trustworthy by other (e.g., downstream) entities as well.

To initiate the generation of device claims, attestation server 142 issues a request to claims engine 144, which resides on server 140. In the example shown, claims engine 144 queries active directory 150 to retrieve information relating to client device 110 and/or its user (if compound authentication is performed, as described below).

Claims engine 144 then evaluates information received from the sources described above, including attestation server 142 and active directory 150, and determines which device claims relating to client device 110 should be generated. In some embodiments, this determination is driven at least in part by one or more policies implemented by claims engine 144 governing which device claims should be generated based on information received. The policy(ies) may, for example, take into account an indication of the trust attestation server 142 has in the information, which indication may be generated using any suitable technique. Of course, embodiments of the invention are not limited to such an implementation, as claims generation need not be controlled using one or more policies, and if one or more policies are employed, they need not account for indications of trust.

An indication of the device claims that should be generated is then passed by claims engine 144 to claims generator 146. In the example of FIG. 1, claims generator 146 includes the device claims in an X.509 certificate, although (as noted above) embodiments of the invention are limited to such an implementation. Device claims may be included in any one or more data structures, taking any suitable one or more formats. If an X.509 certificate is employed, claims generator 146 may provide the certificate including the device claims to attestation client 112 via attestation server 142 and network(s) 130.

Figure 2:
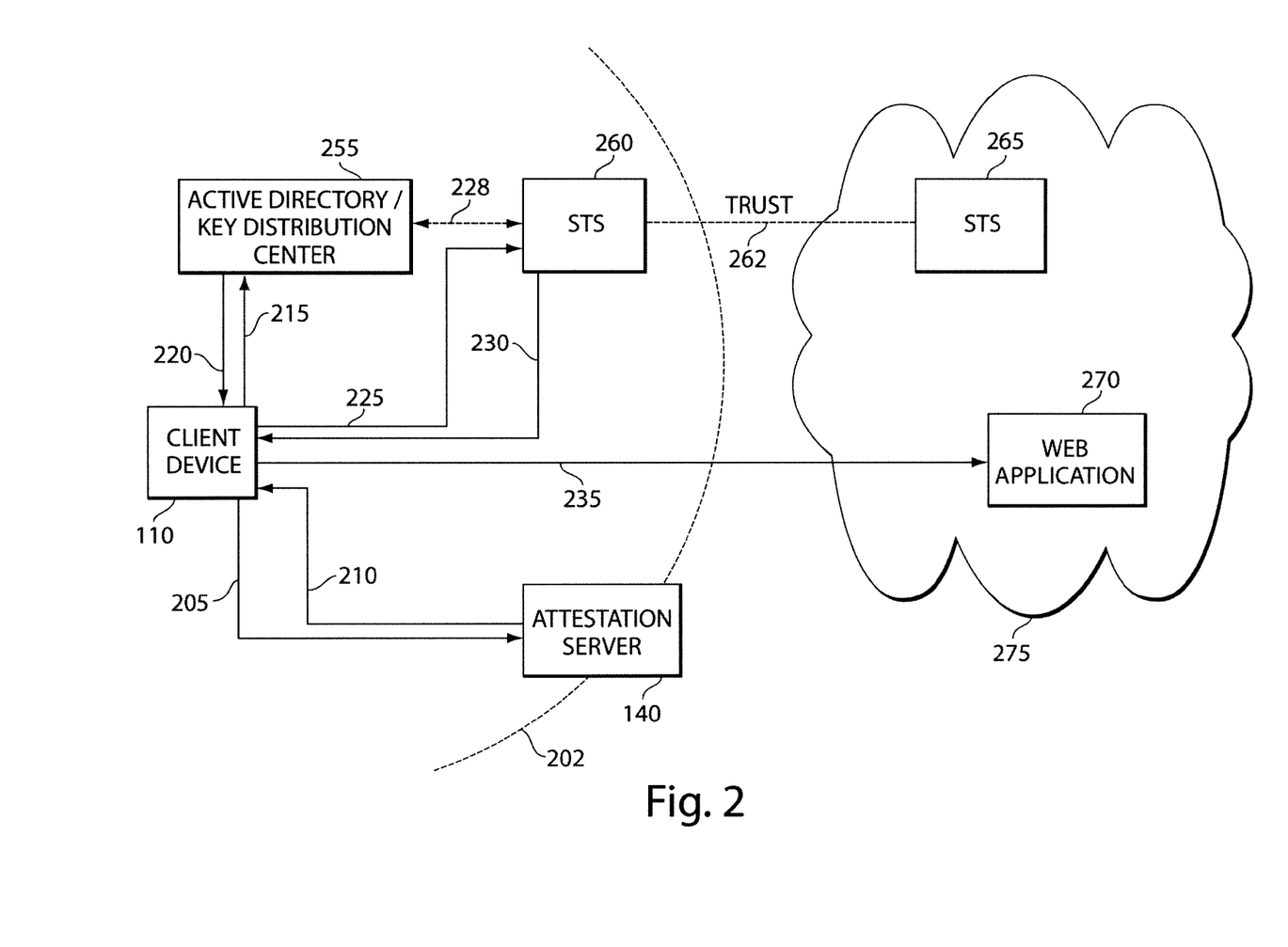
FIG. 2 is a block diagram depicting an example system which includes components for producing device claims information in a format suitable for consumption by a web application.

FIG. 2 depicts an example system wherein device claims included in a certificate (e.g., produced by the example system shown in FIG. 1) are converted into a form suitable for processing by web application 270. Specifically, in the example system of FIG. 2, device claims in a certificate are first included in a Kerberos ticket, which is then converted to a SAML token, which is a form conventional applications are configured to process. Client device 110 may employ the SAML token in relation to an attempt to access web application 270. For example, in some embodiments, client device 110 executes a browser application to initiates access to web application 270, and the browser may employ a SAML token in connection with an access attempt. However, embodiments of the invention are not limited to such an implementation, as any suitable application, browser or otherwise, may use information provided in any suitable form in connection with an access attempt. It should also be appreciated that although the example system shown in FIG. 2 depicts a web application to which client device 110 attempts access, embodiments of the invention are not limited to such an implementation, and may provide for access to any application, service, object or other component, which may be accessible via any one or more communication protocol, which may or may not include the hypertext transfer protocol (HTTP). Embodiments of the invention are not limited in this respect.

In the example shown, client device 110 first obtains a certificate which includes device claims from attestation server 140, such as in the manner described above with reference to FIG. 1. FIG. 2 symbolically represents this processing as the interaction between client device 110 and attestation server 140 which is indicated via arrows 205 and 210.

In the example shown, once client device 110 is provided with a certificate which includes device claims, client device 110 issues a request to active directory/key distribution center (AD/KDC) 255 to generate a Kerberos ticket which includes the device claims, as indicated by arrow 215. Generation of a Kerberos ticket may be performed in any of numerous ways, as embodiments in the invention are not limited in this respect. One example technique is disclosed in above-referenced U.S. patent application Ser. No. 12/822,724, in which AD/KDC 255 provides a ticket granting ticket (TGT) to client device 110, and client device 110 uses the TGT to request that a ticket granting service (not shown in FIG. 2) issue a Kerberos ticket which includes device claims, although embodiments of the present invention are not limited to such an implementation. In the example shown, a Kerberos ticket having device claims embedded therein, is provided to client device 110, as indicated via arrow 220.

In some embodiments, compound authentication (e.g., of both client device 110 and its user) may be performed. For example, the request issued by client device 110 to AD/KDC 255 may be for a TGT which includes not only device claims, but user claims as well. In such implementations, AD/KDC 255 may retrieve information relating to the user, and include this information, or a derivation thereof, as user claims together with the device claims in the TGT that is provided to client device 110.

It should be appreciated that the above-described interaction between client device 110, attestation server 140 and AD/KDC 255 may be performed at any time, and need not be in direct response to an attempt by client device 110 to access web application 270. For example, client device may interact with attestation server 140 and AD/KDC 255 prior to attempting access to web application 270, so that the client device has a TGT with embedded device claims (and/or user claims if compound authentication is performed) when access to web application 270 is desired. Embodiments of the invention are not limited to obtaining a Kerberos ticket at any particular time, or in response to any particular event, as any suitable implementation may be employed.

In the example shown, when client device 110 attempts access to web application 270, web application 270 redirects client device 110 to security token service (STS) 265. This may be accomplished in any of numerous ways, as embodiments of the invention are not limited to any particular technique. In the example shown, web application 270 has a trust relationship with STS 265. Such an affiliation or relationship between web application 270 and STS 265 may be formed or indicated using any suitable approach, as embodiments of the invention are not limited in this respect. For example, STS 265 may be made available by the provider of web application 270 specifically to receive redirected requests from client devices seeking to access web application 270, may be a standalone service established for this purpose, or may form part of any other suitable arrangement. Any of numerous implementations are possible, and embodiments of the invention are not limited in this respect.

In the example shown, STS 265 then redirects client device 110 to STS 260, which resides on the same side of organizational boundary 202 as client device 110, and which has a trust relationship with STS 265. As with the trust relationship between web application 270 and STS 265, the trust relationship between STS 265 and STS 260 may be formed or indicated using any suitable technique. For example, the trust relationship between STS 265 and STS 260 may have been established prior to client device 110's attempt to access web application, and STS 260 may be made available specifically to handle redirected requests from client devices to access web applications. Any of numerous implementations are possible.

In the example shown, when STS 260 receives the redirected access request, it instructs client device 110 to request a Kerberos ticket from a ticket granting service to access STS 260. When the Kerberos ticket is obtained, it is provided to STS 260, which extracts the device claims and transforms them into claims in SAML token. In some embodiments, device claims are included the SAML token by transferring information from the Kerberos ticket to the SAML token. However, any of numerous transformations or derivations of information provided in the Kerberos ticket are possible and may be performed, as embodiments of the invention are not limited in this respect.

In some embodiments, STS 260 may include user claims as well as device claims in a newly generated SAML token. If user claims are to be included, STS 260 may verify information supplied by the user (e.g., via Form Based Authentication) with AD/KDC 255, indicated via dotted arrow 228. For example, information supplied by the user may be verified using information retrieved from the active directory server, and if verifiable may be included as user claims in the SAML token.

Once a SAML token is generated, STS 260 signs the token and returns it to client device 110, and then redirects client device 110 to STS 265. Client device 110 provides the newly generated SAML token to STS 265. Because STS 260 generated the SAML token, and there is a trust relationship between STS 260 and STS 265, STS 265 then generates and signs a SAML token, and issues it to client device 110. Given the trust relationship between STS 265 and web application 270, when client device presents the SAML token issued by STS 265, web application 270 grants access to client device 110, as indicated via arrow 235.

Web application 270 may use the device claims included in the SAML token in any of numerous ways. For example, web application 270 may use information provided in device claims to verify that certain security measures are in place on client device 110 before granting access to particular types of data. In this respect, some organizations conventionally require that a client device have a BitLocker, which is an encryption component that prevents unauthorized access to data if the device is misappropriated, activated in order to access certain (e.g., high business impact) data. Web application 270 may employ information in device claims included in a SAML token to determine whether client device 110 has a BitLocker activated before granting access to certain data, and/or certain application functionality.

In another example, web application 270 may use information in device claims to verify that no known malware executes on client device 110 before granting access to certain data. For example, information in device claims included in a SAML token may be used by web application 270 to verify that no known malware resides on client device 110 before providing access to certain data and/or application functionality.

The information in device claims may also be employed by application functionality that is unrelated to security. For example, the information in device claims may indicate characteristics or capabilities of a device, and this information may be used by web application 270 to tailor output suited to those characteristics or capabilities. For example, if client device 110 were a mobile telephone having a certain CPU, amount of memory, screen resolution, etc., device claims indicating these characteristics may be included in a SAML token provided to web application 270, and web application 270 may use this information to generate and/or alter content suited to the device's characteristics.

It should be appreciated that the examples given above represent but a few of the numerous potential ways that an application could process information provided in device claims. Embodiments of the invention are not limited to using the information in any particular way.

Figure 3:
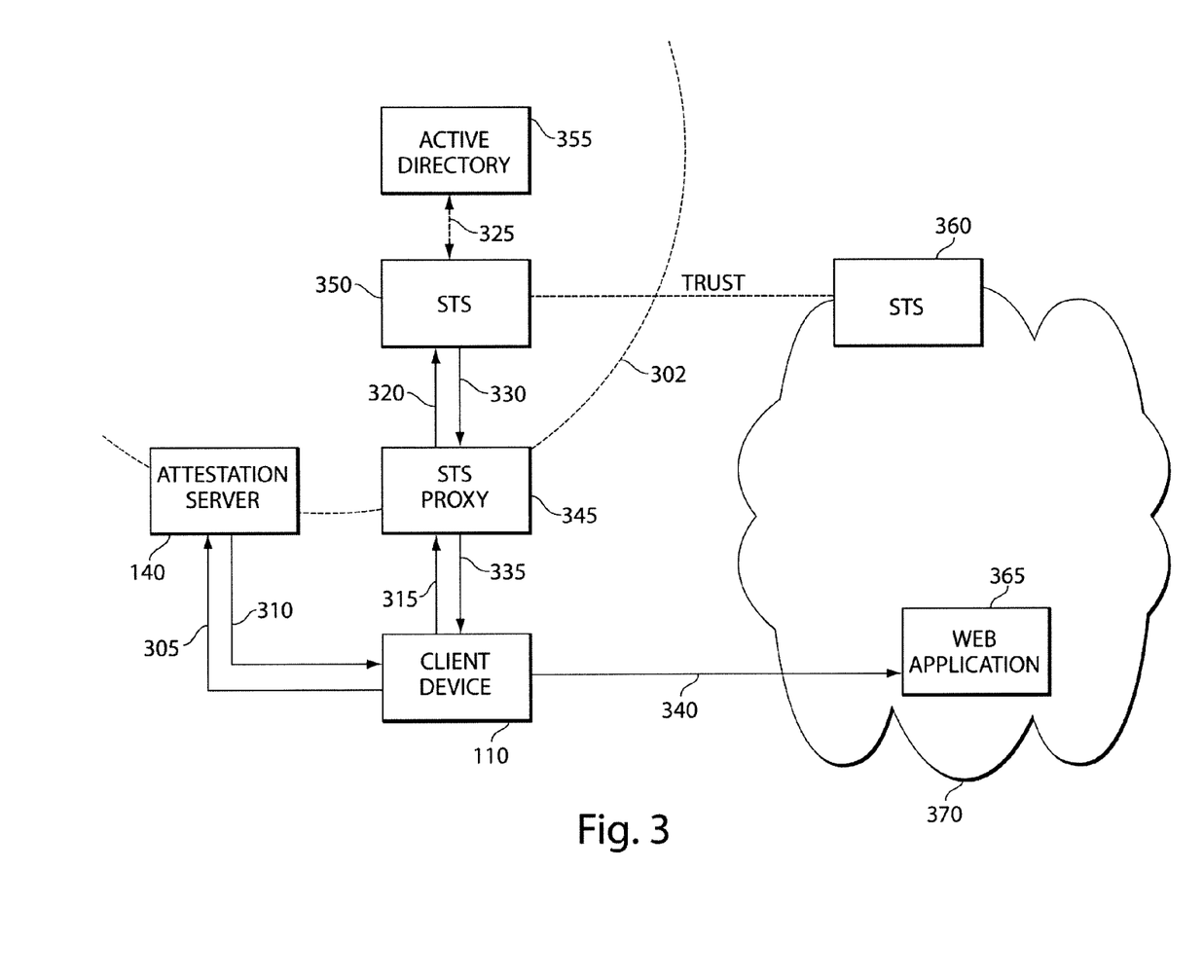
FIG. 3 is a block diagram depicting a system including components useable for converting a machine certificate to a SAML token, in accordance with some embodiments of the invention.

It should also be appreciated that although FIG. 2 depicts a SAML token including device claims being generated from a Kerberos ticket, not all embodiments of the invention are limited to such an implementation. For example, a SAML token could instead be generated directly from a certificate, without the interim step of generating a Kerberos ticket being performed. FIG. 3 depicts an example system in which a SAML token including device claims information is generated from a machine certificate received from an attestation server, without first converting the certificate to a Kerberos ticket.

In the example shown in FIG. 3, client device 110 first obtains a certificate that includes device claims from attestation server 140, which may be performed in much the same manner as is described above with reference to FIG. 1. FIG. 3 symbolically represents this process as the interaction between client device 110 and attestation server 140 indicated via arrows 305 and 310.

Once client device 110 receives a certificate including device claims, it provides the certificate to STS proxy 345, as indicated via arrow 315. If compound (i.e., user and device) authentication is desired, STS proxy 345 may require a user of client device 110 (not shown in FIG. 3) to authenticate, such as via Form Based Authentication (FBA). If user and device authentication is successful, STS proxy 345 provides the certificate to STS 350, as indicated via arrow 320. STS 350 then verifies user information by querying active directory 355, as indicated via dotted arrow 325. STS 350 then generates a SAML token, including in the token verified user information received from active directory 355 and device information provided in the certificate. As in the process described above with respect to FIG. 2, device claims may be included in the SAML token by transferring information from the certificate to the SAML token, or by applying any of numerous transformations to information included in the certificate. Embodiments of the invention are not limited in this respect.

STS 350 then provides the SAML token to STS proxy 345, as indicated via arrow 330, and STS proxy 345 then provides the SAML token to client 110, as indicated via arrow 335. Client device 110 then provides the SAML token to web application 365 in a request to access the application. Client device 110 then uses the SAML token in connection with an access attempt, as indicated by arrow 340.

It should be appreciated that STS proxy 345 is provided because in the arrangement shown, flexibility is provided for the client device to be outside organizational boundary 302. For example, if client device 110 were within organizational boundary 302, then a Kerberos ticket might instead be employed.

It should further be appreciated that the techniques described above with reference to FIGS. 2 and 3 are merely exemplary, and that embodiments of the invention may not include the creation of a SAML token for use in accessing a web application. For example, some embodiments of the invention may provide for the generation of a Kerberos ticket which includes device claims information, and providing that ticket to a web application without first converting to a SAML token. Other embodiments may call for a certificate which includes device claims to be provided to an application without any conversion, to a SAML token or otherwise, being performed. Embodiments of the invention are not limited to any particular implementation.

Figure 4:
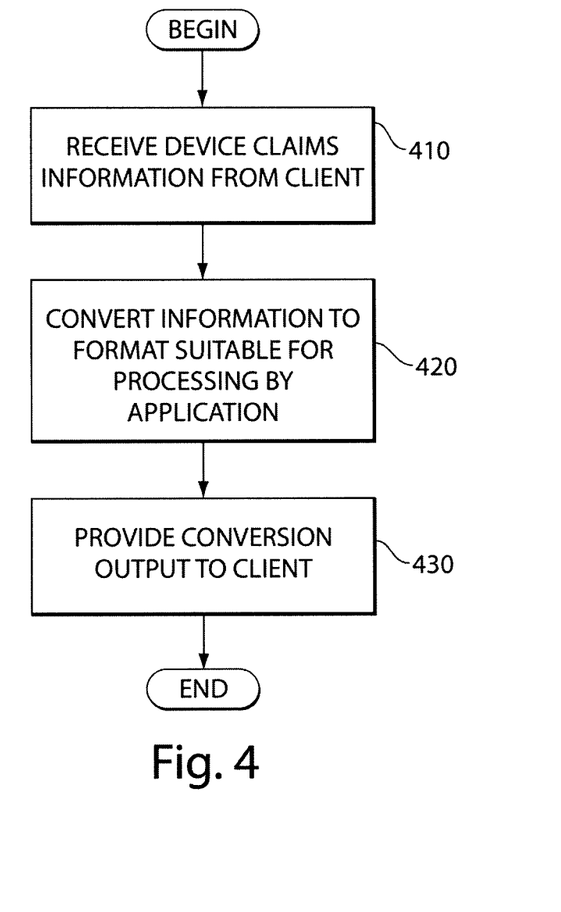
FIG. 4 is a flow chart depicting an example process whereby a security token service receives and processes device claims information from a client device, in accordance with some embodiments of the invention.
Figure 5:
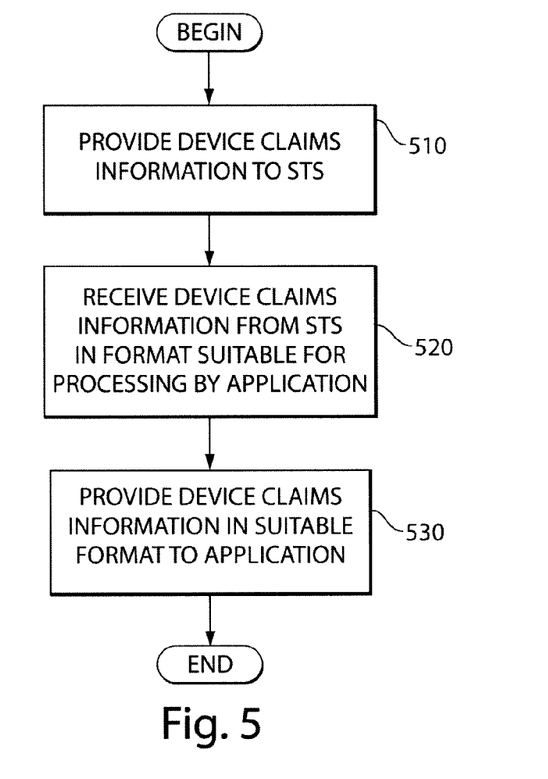
FIG. 5 is a flow chart depicting an example process whereby a client device procures device claims information in a format suitable for consumption by an application.
Figure 6:
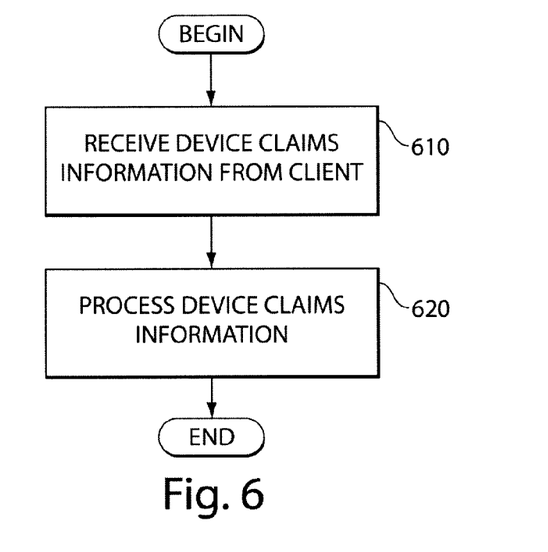
FIG. 6 is a flow chart depicting an example process whereby an application may process device claims information received from a client device.

FIGS. 4-6 depict example processes performed by components depicted in FIGS. 1-3. Specifically, FIG. 4 depicts an example process whereby a STS receives and processes device claims information from a client device, FIG. 5 depicts an example process whereby a client device provides device claims information to a STS and receives information in a form suitable for consumption by an application, and FIG. 6 depicts an example process whereby an application receives and processes device claims.

Referring first to FIG. 4, at the start of the example process shown, device claims information is received by an STS from a client device in act 410. In act 420, the device claims information is converted so as to be included in output which is in a format suitable for processing by an application. For example, the device claims information may be included in a SAML token, Kerberos ticket, and/or other one or more formats suitable for processing by an application. In act 430, the conversion output is provided to the client device. The example process of FIG. 4 then completes.

At the start of the example process shown in FIG. 5, a client device provides device claims information to an STS in act 510. In act 520, the device claims information is then received from the STS in a format suitable for processing by an application. In act 530, the device claims information is then provided to an application. The example process of FIG. 5 then completes.

At the start of the example process shown in FIG. 6, an application receives device claims information from a client device, provided in a format which the application is configured to process, in act 610. The application then processes the device claims information in act 620. The processing may, for example, comprise performing a function that depends on an attribute of the client device described by the device claims. The example process of FIG. 6 then completes.

Figure 7:
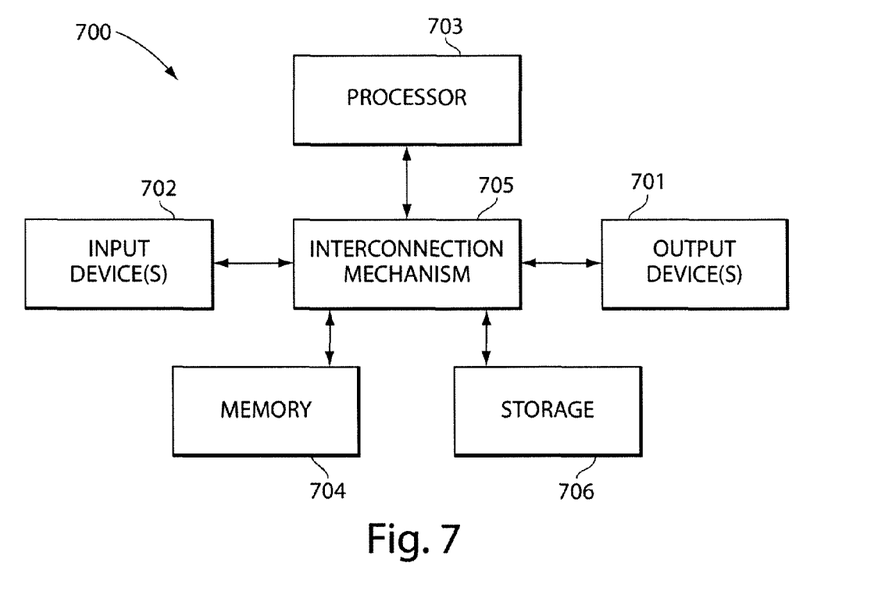
FIG. 7 is a block diagram depicting an example computer system on which some embodiments of the invention may be implemented.

Various aspects of the systems and methods for practicing features of the invention may be implemented on one or more computer systems, such as the exemplary computer system 700 shown in FIG. 7. Computer system 700 includes input device(s) 702, output device(s) 701, processor 703, memory system 704 and storage 706, all of which are coupled, directly or indirectly, via interconnection mechanism 705, which may comprise one or more buses, switches, networks and/or any other suitable interconnection. The input device(s) 702 receive(s) input from a user or machine (e.g., a human operator), and the output device(s) 701 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 703 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Processor 703 may also execute one or more computer programs to implement various functions. These computer programs may be written in any type of computer program language, including a procedural programming language, object-oriented programming language, macro language, or combination thereof. These computer programs may be stored in storage system 706. Storage system 706 may hold information on a volatile or non-volatile medium, and may be fixed or removable. Storage system 706 is shown in greater detail in FIG. 8.

Figure 8:
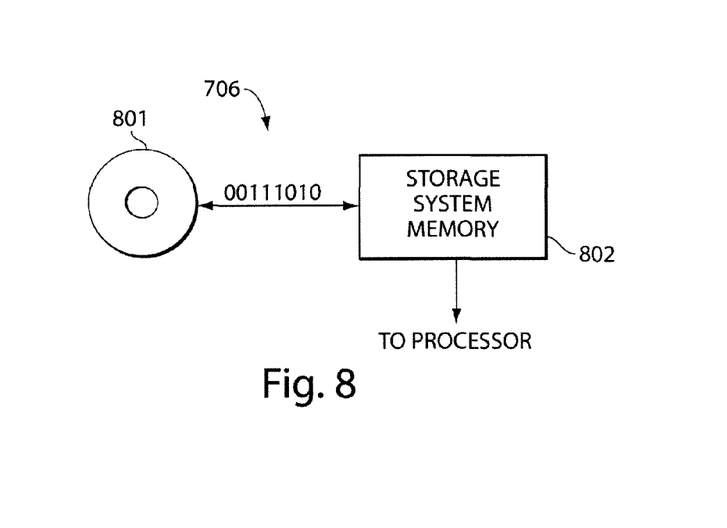
FIG. 8. is a block diagram depicting an example memory on which instructions embodying aspects of the present invention may be stored.

Storage system 706 may include a tangible computer-readable and -writable non-volatile recording medium 801, on which signals are stored that define a computer program or information to be used by the program. The recording medium may, for example, be disk memory, flash memory, and/or any other article(s) of manufacture usable to record and store information. Typically, in operation, the processor 703 causes data to be read from the nonvolatile recording medium 801 into a volatile memory 802 (e.g., a random access memory, or RAM) that allows for faster access to the information by the processor 703 than does the medium 801. The memory 802 may be located in the storage system 706 or in memory system 704, shown in FIG. 4. The processor 403 generally manipulates the data within the integrated circuit memory 704, 802 and then copies the data to the medium 801 after processing is completed. A variety of mechanisms are known for managing data movement between the medium 801 and the integrated circuit memory element 704, 802, and the invention is not limited to any mechanism, whether now known or later developed. The invention is also not limited to a particular memory system 704 or storage system 706.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
   (A) receiving, by an application at a computing device from a client device via at least one network, one or more converted device claims, each converted device claim including a device claim, each device claim including an attribute of the client device and used to authenticate the client device with the computing device, the device claim not recognized by the application, a converted device claim recognized by the application;
   (B) employing at least one processor to process the one or more converted device claims, the processing enabling performance of a function of the application that depends on the attribute of the client device described by each of the one or more converted device claims.

2. The method of claim 1, wherein the application is a web application, and wherein (A) comprises receiving a Security Assertion Markup Language (SAML) token that includes the one or more device claims.

3. The method of claim 1, wherein, prior to (A), each of the one or more converted device claims are generated for the client device by a remote attestation facility to provide a trustworthy representation of the attribute of the client device.

4. The method of claim 1, wherein each converted device claim received in (A) describes an attribute of the client device selected from a group of attributes consisting of:
   whether the client device is equipped with security software,
   whether the client device employs a firewall,
   whether a firewall employed by the client device is operational,
   whether anti-virus signatures on the client device are up-to-date,
   a role performed by the client device,
   an organization to which the client device is affiliated,
   an owner of the client device, and
   a geographic location of the client device.

5. The method of claim 1, wherein (B) comprises performing a security-related function.

6. The method of claim 5, wherein performing the security-related function comprises one or more of determining that a security component is implemented on the client device before granting access to data or application functionality, and determining that malicious software does not execute on the client device before granting access to data or application functionality.

7. The method of claim 1, wherein (B) comprises generating an output tailored to an attribute of the client device described by the one or more converted device claims.

8. A computer-readable storage medium having instructions encoded thereon which, when executed, perform a method comprising:
   (A) receiving, from a client device via at least one network, one or more device claims each describing an attribute of the client device and used to authenticate the client device, each device claim not recognized by the application;
   (B) generating a data structure which includes the one or more device claims, the data structure having a format suitable for processing by an application; and
   (C) providing the data structure to the client device for use in connection with a request by the client device to access the application.

9. The computer-readable storage medium of claim 8, wherein (A) comprises receiving a certificate which includes the one or more device claims each describing an attribute of the client device.

10. The computer-readable storage medium of claim 8, wherein (A) comprises receiving a Kerberos ticket which includes the one or more device claims each describing an attribute of the client device, the Kerberos ticket having been generated based on a certificate which includes the one or more device claims.

11. The computer-readable storage medium of claim 8, wherein (B) comprises generating a SAML token which includes the one or more device claims.

12. The computer-readable storage medium of claim 8, wherein the instructions are executed by a security token service (STS) having a trust relationship with the application or with an entity having a trust relationship with the application.

13. The computer-readable storage medium of claim 12, wherein the instructions are executed by the STS upon the client device being redirected to the STS after attempting to access the application.

14. The computer-readable storage medium of claim 8, wherein (A) further comprises receiving one or more user claims each describing an attribute of a user of the client device, and (B) further comprises generating the data structure to also include the one or more user claims.

15. A client device, comprising at least one processor programmed to:
   request, from an attestation facility accessible to the client device via at least one network, a certificate which includes one or more trustworthy device claims, each trustworthy device claim describing an attribute of the client device, each trustworthy device claim used to authenticate the client device and not recognized by a web application;
   provide, to a security token service (STS), the certificate or a Kerberos ticket generated using the certificate, the certificate or a Kerberos ticket including the one or more trustworthy device claims;
   receive, from the STS, a Security Assertion Markup Language (SAML) token including the one or more trustworthy device claims; and
   employing the SAML token including the one or more trustworthy device claims in connection with a request to access the web application.

16. The client device of claim 15, wherein the processor is further programmed to enable the client device to function as a desktop computer, laptop computer, mobile telephone, personal digital assistant, content reproduction device, television, or gaming console.

17. The client device of claim 15, wherein each of the one or more trustworthy device claims describes an attribute of the client device selected from a group of attributes consisting of:
   whether the client device is equipped with security software,
   whether the client device employs a firewall,
   whether a firewall employed by the client device is operational,
   whether anti-virus signatures on the client device are up-to-date,
   a role performed by the client device,
   an organization to which the client device is affiliated,
   an owner of the client device, and
   a geographic location of the device.

18. The client device of claim 15, further comprising a web-enabled component, and wherein the at least one processor is programmed to enable the web-enabled component to employ the SAML token in connection with a request to access the web application.

19. The client device of claim 17, wherein the web-enabled component comprises a browser application.

20. The client device of claim 15, wherein the at least one processor is further programmed to receive, from the web application, output tailored to at least one attribute of the client device described by the one or more trustworthy device claims.

* * * * *